Figure 1:
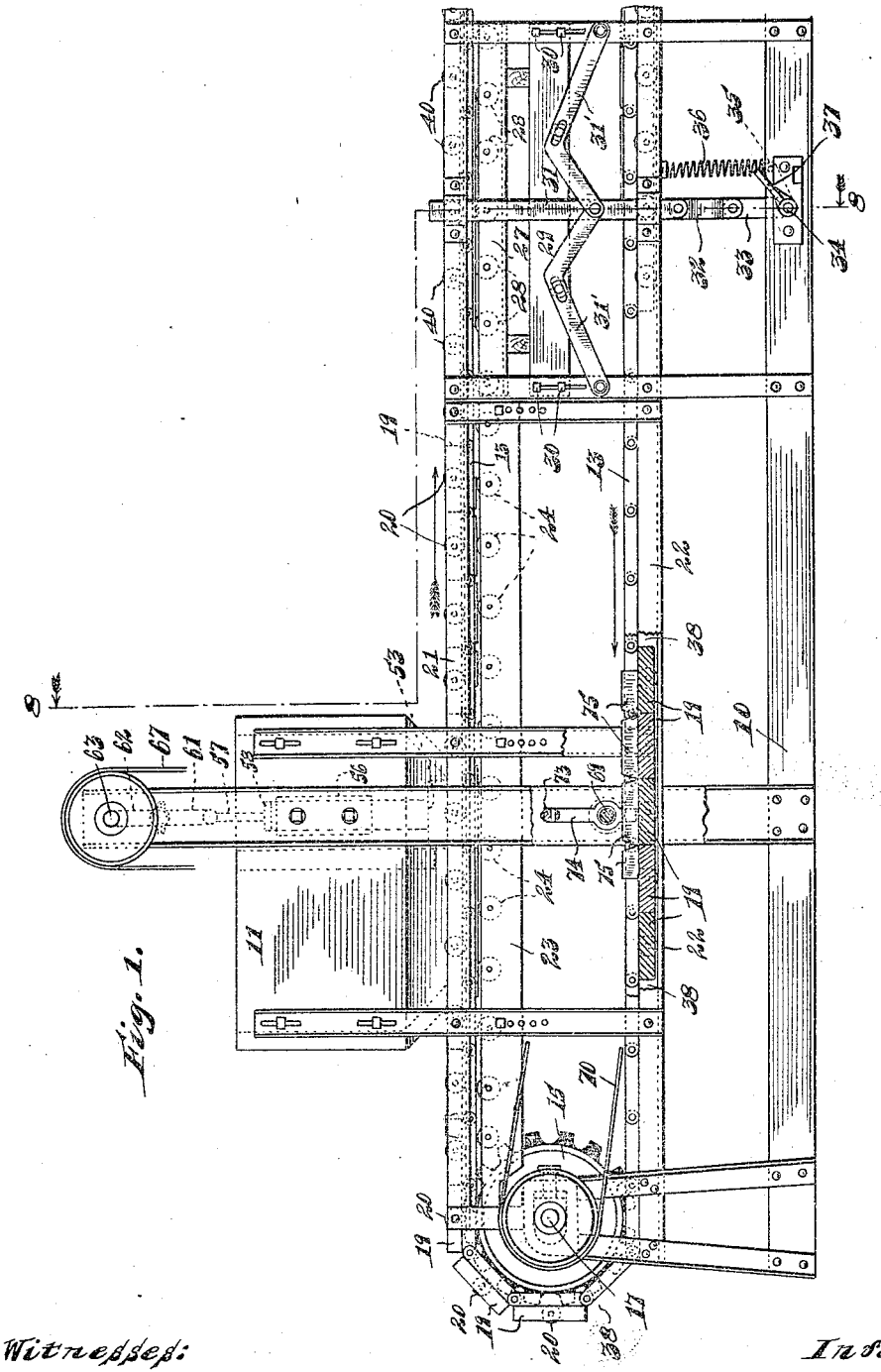

W. P. ROBINSON.
MOLDING MACHINE.
APPLICATION FILED FEB. 12, 1918.

1,293,932.

Patented Feb. 11, 1919.
5 SHEETS—SHEET 1.

Witnesses:
C. E. Wessels
B. G. Richards

Inventor:
William P. Robinson,
By Joshua R. H. Potts
his Attorney.

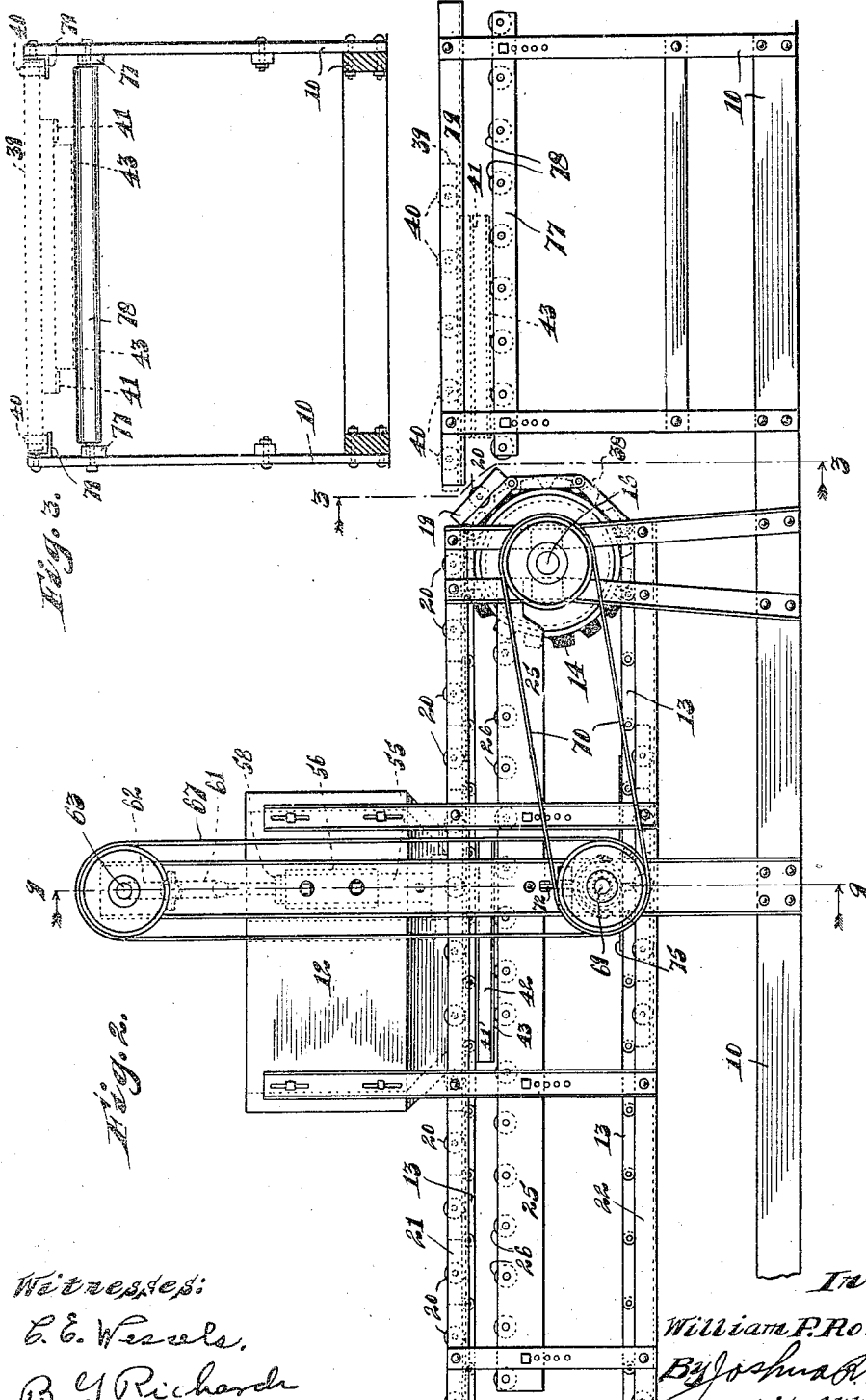

W. P. ROBINSON.
MOLDING MACHINE.
APPLICATION FILED FEB. 12, 1918.
1,293,932.
Patented Feb. 11, 1919.
5 SHEETS—SHEET 3.
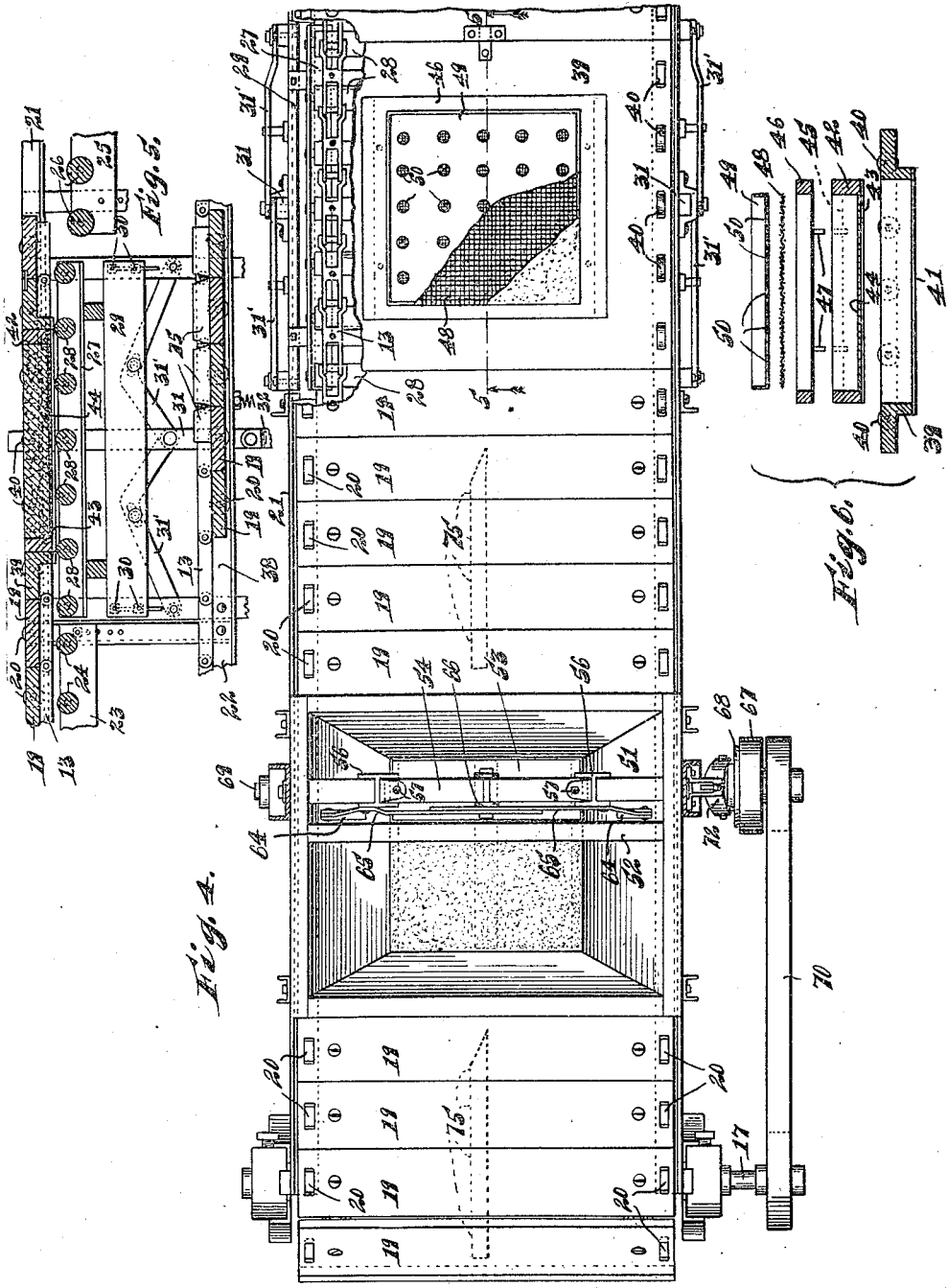
Witnesses:
C. E. Wessels
B. G. Richards
Inventor:
William P. Robinson,
By Joshua R. H. Potts,
his Attorney.

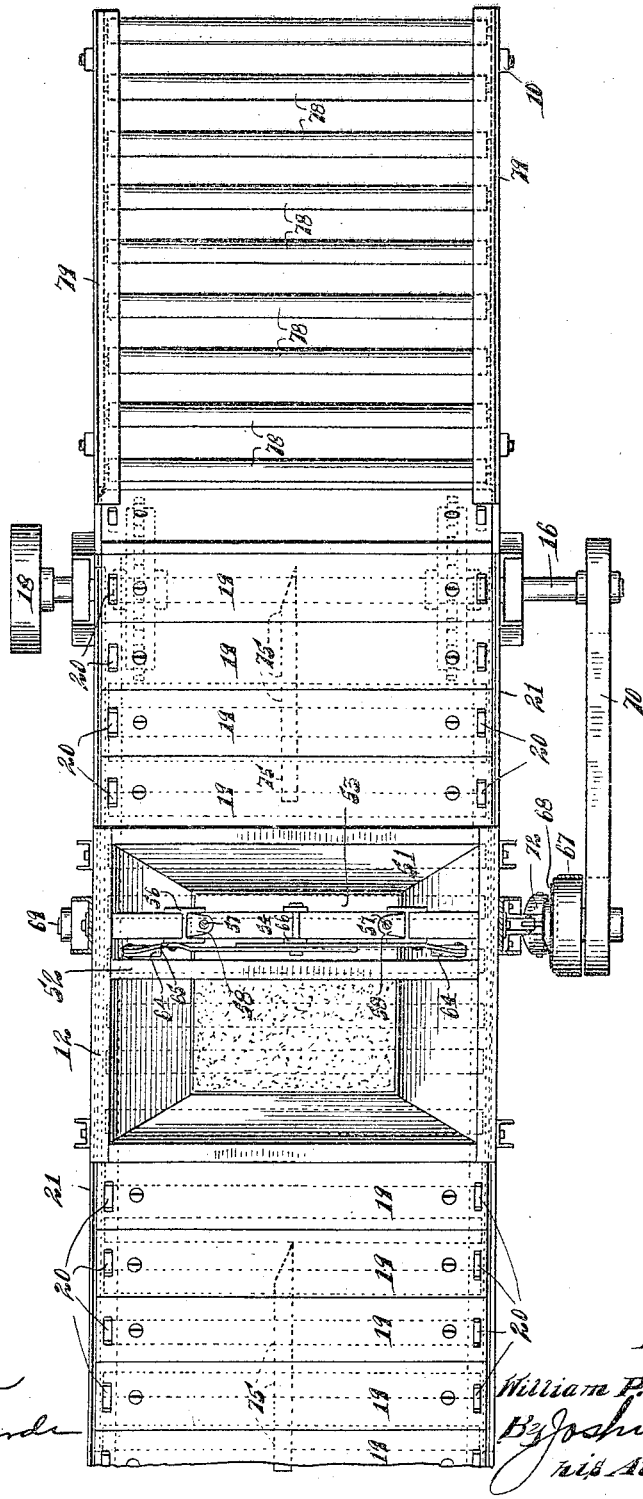

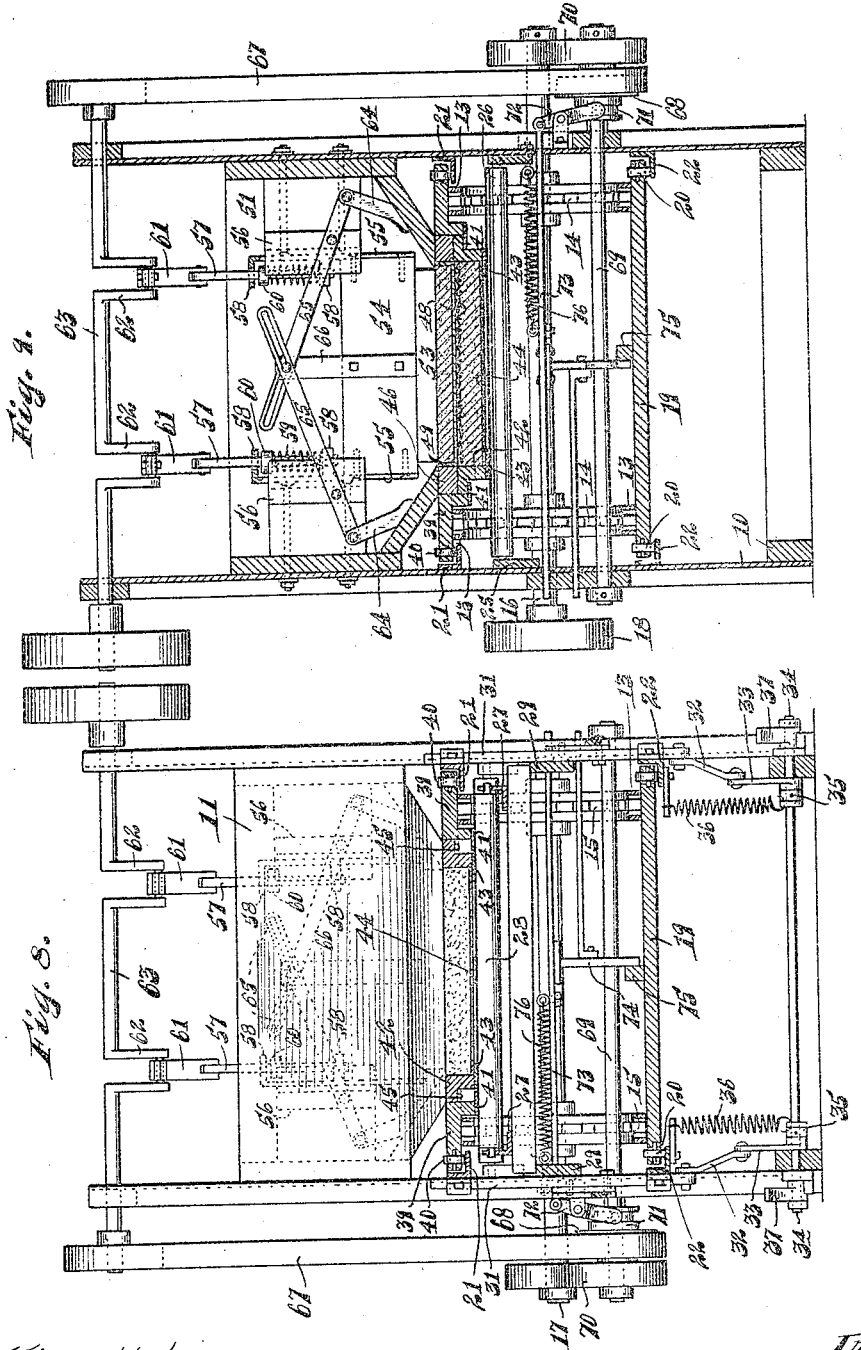

UNITED STATES PATENT OFFICE.

WILLIAM P. ROBINSON, OF HAMMOND, INDIANA.

MOLDING-MACHINE.

1,293,932.   Specification of Letters Patent.   Patented Feb. 11, 1919.

Application filed February 12, 1918.   Serial No. 216,713.

*To all whom it may concern:*

Be it known that I, WILLIAM P. ROBINSON, a citizen of the United States, and a resident of the city of Hammond, county of Lake, and State of Indiana, have invented certain new and useful Improvements in Molding-Machines, of which the following is a specification.

My invention relates to improvements in molding machines, especially adapted for use in molding concrete blocks and has for its object the provision of an improved machine of this character, which is of simple construction and capable of manufacturing such blocks with great speed and efficiency.

The invention consists in the combinations and arrangements of parts hereinafter described and claimed.

The invention will be best understood by reference to the accompanying drawings forming a part of this specification, and in which, Figure 1 is a side view, with portions broken away and others shown in section, of the forward or entry end of a machine embodying the invention, Fig. 2, a side view of the rear or discharge end of the machine, Fig. 3, a transverse section taken on line 3—3 of Fig. 2, Fig. 4, a top plan view corresponding with Fig. 1, Fig. 5, a section taken on line 5—5 of Fig. 4, Fig. 6, a series of views showing the different parts of a mold employed in the machine, Fig. 7, a top plan view corresponding with Fig. 2, Fig. 8, a section taken on line 8—8 of Fig. 1, and Fig. 9, a section taken on line 9—9 of Fig. 2.

The preferred form of construction as illustrated in the drawings comprises a suitable frame 10 having concrete feed hoppers 11 and 12 positioned over the front or feed end and the rear or discharge end respectively of the machine. An endless belt conveyer is arranged to travel over and through the frame 10, said conveyer consisting of two endless chains 13 arranged to travel over sprockets 14 and 15 fixed respectively to transverse shafts 16 and 17 at the rear and front of said frame. The shaft 16 constitutes the master shaft of the machine and is provided at one side with a driving pulley 18, by means of which the machine is driven by an ordinary belt. Chains 13 carry a plurality of closely adjoining laterally extending boards or slats 19, having rollers 20 mounted in the ends thereof and adapted to run or travel on angle iron guides 21 and 22 extending respectively through the upper and lower portions of frame 10. Arranged in the forward portion of the frame 10 is a supporting table 23 having supporting rollers 24 mounted therein, and a similar table 25 is arranged in the rear portion of the frame and provided with supporting rollers 26, the supporting rollers 26 being arranged at a lower level than the supporting rollers 24, as indicated. A vertically movable supporting table 27, provided with supporting rollers 28, is positioned centrally of the machine and between the supporting tables 23 and 25. The supporting table 27 is carried by supporting bars 29 having headed studs 30 slidable in vertical slots in the sides of frame 10, as best shown in Fig. 1. At each side a vertically sliding bar 31 is arranged in the frame of the machine and pivotally connected with links 31' also pivoted on the frame of the machine and given a slot and pin connection with the corresponding side bar 29. At its lower end, each of the bars 31 is connected by a link 32 with a rocker arm 33 on a transverse rocker shaft 34 having another rocker arm 35 secured thereto and connected to the frame of the machine by means of a tension spring 36. Shaft 34 is provided with a foot lever 37 by means of which said shaft may be rocked and the supporting table 27 shifted into registration with the supporting table 25, as will be readily understood.

At intervals the transverse slats or boards 19 are omitted to provide transverse spaces or openings 38 in the traveling conveyer, adapted to receive mold carrying forms 39 having supporting rollers 40 in their ends adapted to run upon the upper guides 21 and thus fit into and constitute a portion of the conveyer. The mold carrying forms are provided with openings or sockets in their centers and having supporting ledges or flanges 41 at their lower side edges, as best shown in Figs. 6, 8 and 9. A lower mold portion 42 is arranged to fit loosely within each of the mold carriers 39 and to pass freely between the supporting ledges or flanges 41, said member 42 being adapted to ride normally upon the rollers 24, 26 and 28. The member 42 is provided with a removable sheet metal bottom 44, normally resting upon supporting ledges or flanges 43 thereon. Mold member 42 is also provided at each side with a supporting flange 45 adapted to engage and rest upon the supporting flanges 41 on the lower side of mold carrier 39, to support said member 42 when in its extreme lowermost position as shown in Fig. 9. An upper mold member 46 is arranged to fit upon the mold member 42, and is provided with dowels 47 arranged to fit within corresponding sockets therein. A plurality of sheets of woven wire mesh material are provided to be inserted within the mold members 46 and a plurality of sheet metal pans 49 provided with perforations 50 in their bottoms are also provided to be inserted within the form members 46 on top of the members 48. Associated with each of the hoppers 11 and 12 is a tamping compartment 51 separated from the hopper compartment by a partition 52, each of said tamping arrangements comprising a tamping head 53 adapted to fit nicely within the mold members and carried by a cross bar 54 mounted upon supports 55, arranged to slide vertically in suitable guides 56 in the corresponding tamping compartment. The supports 55 are operated by means of supporting bars 57 slidable freely through flanges 58 thereon and yieldingly supported by compression springs 59 imprisoned between the lower flanges 58 and collars 60 on said bars 57. Each of the bars 57 is connected by a link 61 with a corresponding crank arm 62 on a transverse operating shaft 63 extending above the corresponding tamping compartment. Scrapers 64 are arranged in each tamping compartment and mounted upon levers 65 having slot and pin connections with a bar 66 on the corresponding member 54, the arrangement being such, that, as each tamping head 53 is moved upwardly by the corresponding crank arm 62, the scraping members 64 are moved downwardly to force any material crowded upwardly by the tamping head into the mold form.

Each of the cross shafts 63 is driven by a belt 67 leading to a loose pulley 68 on a transverse shaft 69 located in the frame of the machine immediately under each of the tamping compartments. Each of the shafts 69 is driven by a belt 70 leading to the corresponding end shaft 16 or 17 as the case may be. Each of the pulleys 68 coöperates with a clutch 71 splined on the corresponding shaft 69 and operated by a lever 72 with a transversely shiftable rod 73 in the frame of the machine, and carrying a depending shifting arm 74 set in the path of cam blocks 75 carried by the slats 19. Tension springs 75 normally hold the clutches 71 out of engagement with the pulleys 68 so as to discontinue operation of the shafts 63.

In operation the hoppers 11 and 12 are filled with freshly mixed concrete material and the machine operated through the medium of pulley 18, an operator being stationed at the forward, central and rear ends of the machine. As each of the open spaces 38 passes the operator at the forward end of the machine, he inserts a mold form 39 therein and a lower mold member 42 within the mold form, said mold form and mold member riding upon the rollers 24. As will be observed, the slats 19 are arranged to constitute traveling bottoms for the hoppers 11 and 12, so that, when a mold member 42 is thus caused to pass under the hopper 11, it will be filled flush with its top with the concrete mixture flowing from said hopper. As the mold member 42 passes under the corresponding tamping compartment 51, a corresponding cam block 75 engages the corresponding arm 74 and throws the corresponding tamping shaft 63 into operation, thus causing automatic tamping of the concrete material, as the mold member 42 passes slowly under the corresponding tamping compartment. When each mold member 42 reaches the central depressible table 27, the operator there fits a mold member 46 having a wire mesh member 48 and a pan member 49 therein, onto the top of mold member 42, and depresses the table 27 by means of the foot lever 37. This causes depression of the mold member into the positions indicated in Fig. 9, and transfers said members onto the supporting rollers 28 at the lower level. As each mold passes under the hopper 12, the upper portion of the same is filled with concrete mixture, which in turn is tamped into place by the corresponding tamping mechanism, thus completing the formation of the concrete blocks, each with metallic reinforcing members embedded therein. When the discharge end of the machine is reached, each mold carrier 39 automatically rides out upon a discharge table 77, equipped with supporting rollers 78 and guides 79, the supporting rollers 78 supporting the bottom of mold member 42, and the guides 79 supporting the rollers 40 in the sides of mold carrier 39, and the mold carriers are then removed by the operator at this station. In this manner concrete blocks having metallic reinforcing members, may be molded and formed with great rapidity and efficiency. After the blocks have set in their forms they are removed and the forms reused, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A molding machine comprising a hopper; a conveyer arranged to travel across and constitute a moving bottom for said hopper; and a mold insertible in said conveyer and arranged to be filled by said hopper, substantially as described.

2. A molding machine comprising a hopper; a conveyer arranged to travel across and constitute a moving bottom for said hopper; a mold insertible in said conveyer and arranged to be filled by said hopper; and a tamping device coöperating with said mold, substantially as described.

3. A molding machine comprising supports at different levels; a conveyer passing over said supports; an extensible mold propelled by said conveyer and traveling on said supports; and spaced hoppers for filling said mold at the different levels, substantially as described.

4. A molding machine comprising supports at different levels, a conveyer passing over said supports; an extensible mold propelled by said conveyer and traveling on said supports; spaced hoppers for filling said mold at the different levels; and tamping means for said mold at each level, substantially as described.

5. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; and a vertically extensible mold insertible in said conveyer opening, substantially as described.

6. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; a vertically extensible mold insertible in said conveyer opening; and tamping means for said mold associated with each of said hoppers, substantially as described.

7. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; a depressible roller support section arranged between said roller supports; and a vertically extensible mold insertible in said conveyer opening, substantially as described.

8. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; a depressible roller support section arranged between said roller supports; a vertically extensible mold insertible in said conveyer opening; and tamping means for said mold associated with each of said hoppers, substantially as described.

9. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; a vertically extensible mold insertible in said conveyer opening; and a roller discharge table arranged to receive the mold from said conveyer, substantially as described.

10. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; a vertically extensible mold insertible in said conveyer opening; tamping means for said mold associated with each of said hoppers; and a roller discharge table arranged to receive the mold from said conveyer, substantially as described.

11. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; a depressible roller support section arranged between said roller supports; a vertically extensible mold insertible in said conveyer opening; and a roller discharge table arranged to receive the mold from said conveyer, substantially as described.

12. A molding machine comprising a frame; two hoppers on said frame; an endless belt conveyer consisting of a plurality of transverse adjoining slats arranged to pass under said hoppers and constituting traveling bottoms therefor, said conveyer having a mold receiving opening therein; roller supports arranged under said hoppers on different levels; a depressible roller support section arranged between said roller supports; a vertically extensible mold insertible in said conveyer opening; tamping means for said mold associated with each of said hoppers; and a roller discharge table arranged to receive the mold from said conveyer, substantially as described.

13. A molding machine comprising a frame; two hoppers on said frame; an endless belt conveyer consisting of a plurality of transverse adjoining slats arranged to pass under said hoppers and constitute traveling bottoms therefor, said conveyer having a mold receiving opening therein; roller supports arranged under said hoppers on different levels; a depressible roller support section arranged between said roller supports; a vertically extensible mold insertible in said conveyer opening; tamping means for said mold associated with each of said hoppers; means for operating said tamping means; automatic means controlled by said conveyer throwing said tamping operating means into and out of operation; and a vertically extensible mold insertible in and removable from said conveyer, substantially as described.

In testimony whereof I have signed my name to this specification in the presence of two subscribing witnesses.

WILLIAM P. ROBINSON.

Witnesses:
JOSHUA R. H. POTTS,
PAULINE ROBINSON.

Copies of this patent may be obtained for five cents each, by addressing the "Commissioner of Patents, Washington, D. C."